United States Patent Office 3,409,408
Patented Nov. 5, 1968

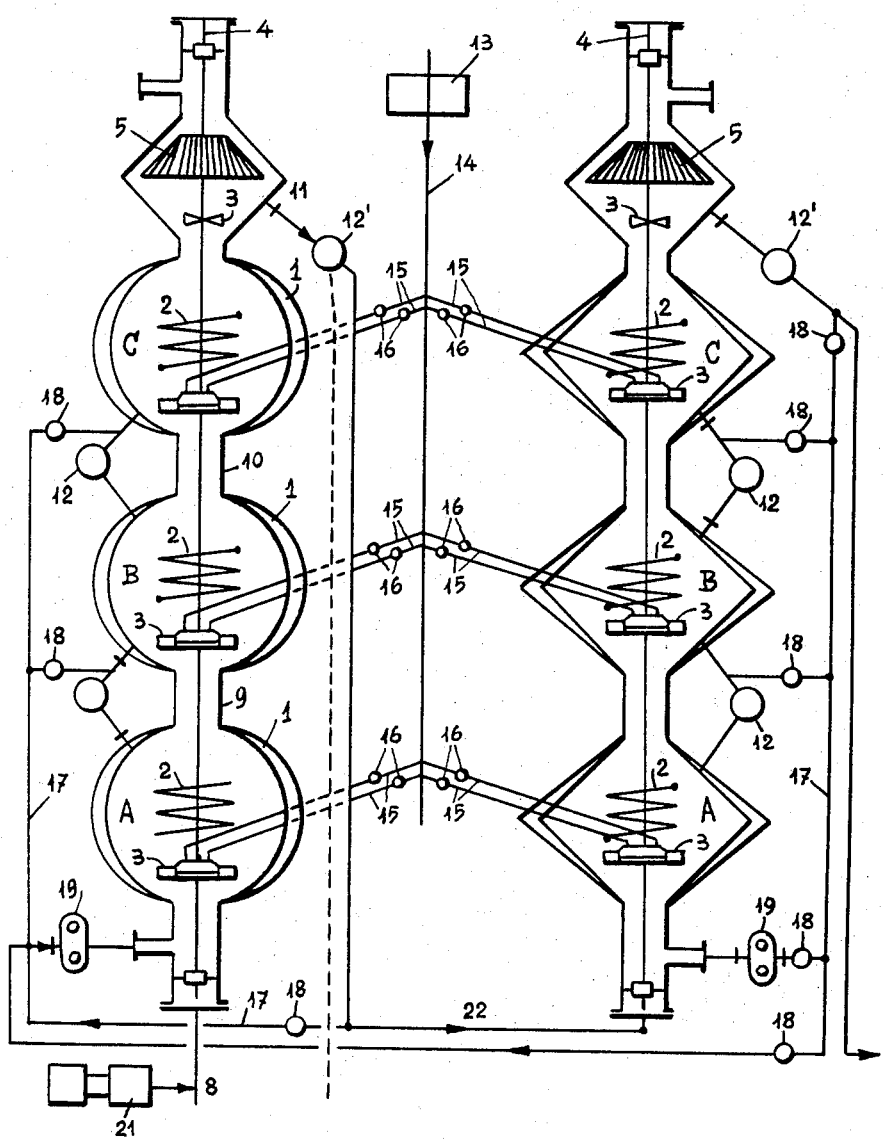

3,409,408
COLUMN REACTOR WITH SERIES REACTION CHAMBERS
Mario Ballestra, Viale Bianca Maria 26, Milan, Italy
Filed Sept. 29, 1964, Ser. No. 400,076
Claims priority, application Italy, Oct. 4, 1963,
20,524/63; Nov. 5, 1963, 23,186/63
3 Claims. (Cl. 23—283)

The present invention has for its object a continuous method for carrying out, controlling and adjusting the development of a chemical exothermic reaction, the final product of which is susceptible to alteration if it is subjected to increases in temperature higher than the desired temperature or to local overheatings.

The present invention has further for its object an apparatus for carrying out the above method.

Examples of the application of the present invention are the treatment with sulphur trioxide of alkylbenzols, alcohols, phenols and toluols or the like, that is, in general, the sulphonation or sulphation of organic compounds.

The method of the present invention is based on the consideration that the main factors effecting the development of a chemical reaction are:

(a) The manner and intensity by which one of the reagents comes into contact with the other reagent;

(b) The degree of agitation and thus of dispersion of the two reagents when coming into mutual contact;

(c) The shape of the space within which the reaction occurs;

(d) The temperature which the two reagents and the reaction product are allowed to reach during the successive steps of development of the reaction.

The method and apparatus according to the invention are based on the adjustment, during the development of the reaction, of all the factors above cited.

According to the invention one of the two reagents, preferably in the gaseous phase or better in the gaseous phase and diluted in an inert gas, is brought into contact with the other reagent in such a quantity per unit time and per unit reactor volume so that the first mentioned reagent may have the chance of reacting with the second reagent in a manner which is gradual and spaced over a period of time.

Also in accordance with this invention the reaction takes place in a reactor divided into a plurality of serially arranged and communicating zones, the first or lower one being fed with a reagent, while the second reagent is fed in parallel into the different zones of the same reactor.

Another feature of the present invention is that the reaction occurs in two or more reactors placed in series, one of the reagents being fed to the lower end of one of the reactors and the reaction product passing serially from reactor to reactor, while the second reagent is distributed in parallel to the zones of each single reactor or to a plurality of the serially arranged reactors.

Each zone of the apparatus of this invention is provided with an agitation means preferably actuated by an adjustable electric motor and by the providing of the reactor with a suitable cooling and/or heating means, the cooling and/or heating means being able to be put singularly in action or out of action, two or more of them being suitable to be connected in series or in parallel.

The apparatus of this invention is further characterized by the inclusion of suitable devices by means of which the reaction degree is controlled and adjusted in the individual zones.

Though the present description refers to two reagents, the invention is equally applicable to reactions among more than two reagents, either simultaneously or successively.

An example of an application of the method and apparatus of the invention is controlled sulphonation and/or sulphation with gaseous sulphur trioxide preferably obtained, by catalysis, from predetermined quantities of molten sulphur.

By fixing the course of the reactions so that it develops gradually while contained in a single reactor with more communicating zones or in more reactors with more communicating zones, the reactors being arranged serially, or in more reactors arranged serially, according to another feature of this invention, the gaseous sulphur trioxide is proportioned and/or possibly diluted and/or produced by catalytic conversion of sulphur dioxide obtained from a quantity of sulphur, proportioned as a function of the feeding of the reactor or reactors with the other reagent.

Further, according to this invention the total amount of gaseous sulphur trioxide possibly diluted with air or other gas, is introduced into the various successive zones of the reaction course either of the same reactor or of more reactors arranged in series and connected in series to one another for the passage of the first reagent which has partly reacted with a portion of the second reagent, the introduction being effected in a controlled and adjustable manner through by-pass pipes connected to the main piping and which optionally are provided with means for regulating the flow. The pipes may have a section approximately proportional with respect to the quantity to be introduced into the various zones of the same reactor or of the successive reactors.

Still another feature which characterizes this invention is that between each zone and the successive zone of the same reactor, respectively between two reactors placed in series, there is inserted a device controlling the reaction degree which controls in the case of sulphonation or sulphation the percentage of unsulphonated or unsulphated material still present in the reaction product coming out of a zone or of a reactor, such a device controlling the percentage of unsulphonated or unsulphated material with respect to the theoretical optimum percentage at the particular phase of reaction, the device reacting to the percentage of unsulphonated or unsulphated material by acting on the various means regulating the reaction development, such as stirring means, feeders of the reagents, cooling and/or heating means and recycling means.

The present apparatus is particularly characterized by the presence of at least a recycling conduit, provided with a pump or the like, with a capacity corresponding to that of the product to be recycled, the recycling conduits being arranged between the outlet of a zone of a reactor and the inlet of same or of a previous zone of the same reactor, respectively between the outlet of a reactor, particularly the last one, and the inlet of same or of previous reactors, particularly of the first reactor, so as to recycle the product not completely sulphonated or sulphated, should this necessity occur.

The above method is finally characterized by the introduction of the second reagent in an adjustable manner in parallel into the different zones of the reactor or of the various reactors, so that there may be removed in the desired degree the reaction heat or there may be fed heat through the exchange surface of the single zones of the single reactors, so as to maintain in said zones exactly the desired temperatures.

According to the present invention, in the event that the reagents have a low reactivity, or in the event that at least one of the reagents is diluted in an inert substance, or in the event that the device has more zones, the total amount of the reagents, reaction products, or gases, or dilution substances, fed and/or produced in the lower zones of the reactors is conveyed from the lower zone of each reactor to the upper zone thereof in correspondence to the mixer provided therein.

The method is then characterized by feeding the first reagent to the first reactor in an amount which is slightly deficient with respect to the total amount of the second reagent in the whole of the various phases or reactors, however, it is always such that at the last reactor the product arrives with an excess of first reagent which has not reacted, said excess however not being in a sufficient amount for reacting with the quantity of second reagent fed to the last reactor, so that a further addition of first reagent into the last reactor brings the reagents again to the desired proportions, the further addition being controlled by the control device for the reaction degree arranged just at the outlet of the product from the last reactor, avoiding the effect of a change of feeding of the first reagent into the first reactor which may affect the last reactor with some delay.

The apparatus embodying the above method is characterized by the presence of the reactor or reactors provided with pipes which in turn are provided with many cocks, valves and the like, recycling pumps, devices for the control of the degree of reaction attained, and the like, as results from the above particularities.

According to one embodiment, the apparatus has more reaction zones and is characterized in that the reaction zones are formed by containers of spheroidal shape or in the shape of two frustocones connected at their larger bases, while the stirring means is placed close to the lower base which is reached through a piping by the second gaseous reagent possibly diluted in an inert gas, so that the whirling motion imparted to the two reagents and to the reaction product may mount, keeping them adherent to the inner wall of the jacket of thermal treatment, thereby preventing the formation of dead zones or of low stirring zones and the consequent local increase in temperature.

According to one embodiment of this invention, when the gaseous second reagent, owing to its high reactivity, is mixed with an inert gas, the latter which remains at the end of the first zone, passes on into the next one with an effect of dilution of the gaseous second reagent mixed with other inert gas introduced therein, and so on, so that in the last zone of the series the gaseous reagent becomes highly diluted and thus less reactive and with the more diluted gaseous reagent there is less danger of causing increases in temperature in the zone of the completion of the formation of the reaction product, which product may be damaged by the temperature. Thus this dilution effect facilitates the maintenance of the desired temperature, notwithstanding that the reaction product becomes more and more viscous and so that it is more and more difficult to prevent local overheatings.

The accompanying drawings show some preferred practical embodiments of the device, said embodiments being shown by way of example only in order to illustrate the method.

FIG. 1 is an axial vertical sectional view of a first apparatus within which it may be conceived that the reaction reaches its completion, said apparatus however may be disposed in series with one or more apparatuses or like the one shown in FIG. 2.

The drawings have two purposes. FIGURES 1 and 2 show how two reactors according to the present invention are operatively interconnected. In this respect, it is to be noted that conduit 14 feeds to both of the reactors. FIGURES 1 and 2 also illustrate alternative configurations of the reactors. Thus, reactor of FIGURE 1 represents one configuration, and the reactor of FIGURE 2 represents another configuration. Thus, the drawings may be considered either to be one figure, in the sense that it shows two reactors according to the invention operatively connected, or may be considered to be two figures, as presently labeled, in the sense that it shows two different configurations of the reactor according to the invention.

Referring to FIG. 1, the reactor is seen to have three parts A, B, C which constitute three successive zones within which the reaction develops; each zone is provided with a cooling or heating jacket 1, a cooling or heating worm pipe 2 and downwards of the zone a stirring means 3, actuated in an adjustable manner by an adjustable electric motor 4 on the shaft of which is arranged also a rotating device 5 which acts by centrifugal force on the outlet of the reaction gases or the inert gas, to centrifuge the possible drops carried therewith.

The jackets are interconnected by pipes not shown, provided with regulating and intercepting means not shown, so as to vary the insertion of the jackets and worm pipes into the cooling/heating circuit or possibly to leave out some of them, and provided with connections for the feeding and discharge of the single jackets. The same may be said for the worm pipes 2.

The feeding of one of the reagents to the apparatus takes place downwardly in the lower zone A through the connection 8 and the first reagent which has partly reacted and together with the reaction product goes out from the top of zone A and, through 9, passes on to zone B from which, owing to a further reaction not yet complete, passes through the connection 10 in zone C; the reaction product goes out from the top of zone C through the conduit 11; 12 is a device linked to the outlet 11 which is preferably inserted between successive zones to examine and control the degree of the reaction occurring in the previous zone, so as to affect, on the ground of the information received, the behavior of the reaction (preferably by means of feeding remote controls 21); 13 is means for catalytically producing sulphur trioxide from a mass of sulphur of pre-established weight relatively to the amount of the feeding of the first reagent through the connection 8 in the first zone. The sulphur trioxide is fed to the conduit 14 provided with branches 15, each of which is provided with an intercepting and adjusting means 16, and feeding, in parallel with the second reagent the single reactors, respectively the single zones of a single reactor or of more reactors, FIG. 1. In such a way the second reagent is fed in a controlled and regulated manner to the single zones A, B, C, within which the reaction develops and said feeding will be adjusted, preferably in an automatic manner by a remote control, through the information which may be deduced from the single devices of control of the degree of the reaction occurred in the previous reactor or zone relatively to the control means 12, and through a connection not shown in the figure.

Each conduit, respectively each passage port of the first reagent and of the product obtained from the reaction in one of the zones within which the reaction develops, is connected, downstream of the device controlling the reaction degree to a conduit 17 provided with an intercepting and adjusting means 18, which recycles by means of a pump 19 the first reagent and the product of the uncomplete reaction obtained, to the first reaction zone to repeat, respectively bring to, the degree desired therein, the reaction itself, stopping or adjusting in the meanwhile the feeding to said zone of the first reagent. Particularly it is to be appreciated that the control of the degree of the obtained reaction may be also effected following the last reactor C through the device 12' which, through suitable valves and cocks, is connected to the recycle pump 19 which sends again the whole to the first reactor A; in this case the capacity of the recycle pump should be corresponding or substantially equal to the capacity of the entire plant at normal work. The recycle pump 19 too may be remote-controlled by the information of the device controlling the obtained final degree.

Numeral 21 denotes a pump, respectively in intercepting or adjusting means, for feeding the first reagent to the first reactor, also the device 21 may be remote-controlled by one of the devices controlling the obtained degree of reaction, particularly by the one denoted by 12' at the outlet of the apparatus.

With reference to FIG. 2, there are seen different shapes of the containers defining the zones A, B, C shown in FIG. 1, said zone being constituted by two bodies with truncated cone shape, connected to each other through the larger base; the various containers being then connected to one another through the smaller bases of the truncated cones. In FIG. 2 are to be conceived as repeated all the particularities of FIG. 1.

The drawing shows the conduit 22 connecting the upper zone of the apparatus according to FIG. 1, to the lower zone of the apparatus according to FIG. 2, for the case when these apparatuses are arranged in series.

Taking again into consideration what has been set forth above with respect to the way in which a highly exothermic reaction develops between two very reactive components, one of which gaseous, possibly diluted in an inert gas, which reaction yields a product particularly liable to be deteriorated by the temperature developing from the reaction, attention has been paid to the fact that the reaction may be controlled and adjusted during its successive steps, by adjusting the action of the mixers of the reagents, respectively of their mixture, by the stirring means 3, or by adjusting and registering the thermal action of the jackets 1, respectively of the coils 2, separately in each zone in order to regulate the removal of part of the reaction heat from each respectively, to increase more or less, one of the zones in which the development of the reaction is divided, or still by regulating and registering the inflow to the respective zones of the first reagent, respectively of the first reagent which has not completely reacted and of the product of the partial reaction, or of the second reagent gaseous or mixed with another inert gas. The regulations and registrations take place on the basis of the information furnished by the devices controlling the reaction degree for the material passing from a zone to the next one, respectively to the outlet of the last zone, and this may be done either manually or by remote controls.

By means of the present invention the reaction temperature in each zone may be kept under the dangerous temperature which may damage the product, and in addition, the final product is practically free of even minimum portions of the first reagent and is further practically free of dangerous residuals of the second reagent which is gaseous. Thus the final reaction product obtained according to this invention may be practically free of residuals of either reagents, so that each of the two reagents is utilized to the utmost, and finally, by means of the same apparatus, the maximum possible yield of product is realized.

In the case when the installation comprises two apparatuses according to the combined FIGS. 1 and 2, the first reagent together with the reaction product coming out of the zone C of the first reactor, is controlled by the device 12′ as to the degree of reaction obtained, and is fed through the conduit 22 to the lower zone A of the apparatus according to FIG. 2.

It is particularly to be appreciated that by the method and apparatus according to the present invention by using for the gaseous reagent, a mixture thereof with an inert gas, the inert gas which is released in a zone further dilutes the gaseous reagent introduced into the successive zone, thus the particular advantage is that said dilution reaches the utmost degree in correspondence to the last zone of reaction, where the product is more sensitive to damage by high temperature, and having a higher viscosity, is in a less and less suitable condition to accomplish the thermal exchanges.

As mentioned above, it is convenient that the process of development of the reaction may be regulated in such a way that the feeding of the first reagent to the first reactor may be slightly in defect with respect to the total feeding of the second reagent in all of the various phases or reactors, however the reaction is always carried out so that the last reactor may be reached by the product with an excess of first reagent which has not reacted, said excess however being not in a sufficient quantity to react with the quantity of the second reagent fed to the last reactor, whereby a further addition of first reagent to the last reactor brings again the reagents to the desired proportions, said further addition being controlled by a device controlling the reaction degree which is situated just at the outlet of the product from the last reactor, avoiding that the effect of a variation in the feeding of the first reagent to the first reactor may effect, with a delay, the last reactor.

In such a way the reaction is well controlled by the feedings to the first zone of the first reactor, but also at the end of the last reactor, so as to prevent the inertia of the transmission of the effect of the regulation effected in the first zone. So for instance there may be several reactors in series which may be either normal mixers with a jacket and cooling worm pipes or devices as shown in FIG. 1 or 2, considering as calibrated the intercepting devices 16 so as the first reactor is reached by 40% of the theoretical quantity of the second gaseous reagent, the second reactor by 30%, the third reactor by 20%, the fourth reactor by 10%, from the pump 21 is fed 95% of theoretical quantity of first liquid reagent. The device 12′ is calibrated so as to show as optimum, the 42% of reaction degree, and acts on the pump 21 in such a way that if in the first reactor the reaction does not reach 42%, the admission of the first reagent is adjusted suitably, preferably by remote control.

In the last reactor which is reached by 10% of gaseous reagent, the admission of the first liquid reagent is adjusted so as to obtain the complete reaction without any excess of reagents.

The above method and apparatus may be particularly used for the sulphonation of dodecylbenzol and/or for sulphation.

Although for descriptive reasons the present invention has been described on the ground of the preceding text and illustrated on the basis of the drawing, many modifications and additions may be made in embodying the invention, as for instance by using the method and apparatus for the sulphonation, or simultaneous sulphonation and sulphation. The invention is especially suitable in the case when one of the two first reagents is more sensitive than the other to the second reagent; as for instance it is possible to eliminate the conduits 15 in the form shown in the drawing and replace them by the shaft provided hollow of the motor 4, said shaft being provided at the top of its cavity with a feeding device for sulphur trioxide possibly diluted in an inert gas, and being further provided in correspondence to each stirring device 3 with an admission device, adjustable and registrable of said sulphur trioxide, said device through many small radial pipes feeds said sulphur trioxide in correspondence to the upper central part of the stirring elements, or spokes or the like, of the stirring device 3; as for instance the series of the successive reactors may be completely of spheroidal type or of truncated cone type or of other type which may realize successive zones of treatment as above described; all these modifications and additions having for their object to embody the method as above characterized and as resumed in the following claims.

What I claim and desire to secure by Letters Patent is:

1. A reactor for carrying out a reaction between a liquid reagent and a gaseous reagent, said reactor having walls defining a plurality of reaction chambers serially arranged as an upright column, each of said reaction chambers having a constricted inlet at its lower end and a constricted outlet at its upper end, the outlet of each reaction chamber opening directly into the inlet of the next reaction chamber, means communicating with the inlet of the lowermost chamber for feeding of the liquid reagent thereto, means communicating in parallel with the reaction chambers for the feeding of the gaseous reagent thereto, said last mentioned means communicating with each reaction chamber at a zone intermediate the upper and lower ends of the reaction chamber, agitating means disposed in said intermediate zone, a hollow shaft mounted upright in the column, said agitating means being mounted on said hollow shaft and said hollow shaft having an inlet to its interior communicating with said means for the feeding of the gaseous reagent and further having outlet openings for the gaseous reagent, said outlet openings for the gaseous reagent being located adjacent to said agitating means, and each reaction chamber being provided with heat exchange means for controlling the temperature of said reaction.

2. A reactor according to claim 1, in which each of said reaction chambers is a hollow sphere and in which said heat exchange means are disposed internally and externally of each of said reaction chambers in order to disperse heat formed during the reaction.

3. A reactor according to claim 1, in which each of said reaction chambers is a hollow body having the geometrical shape of two frustocones having a common large base and thereby also having a pair of opposed small bases, the upper and the lower ends of each of said reaction chambers being defined by said pair of opposed small bases.

References Cited

UNITED STATES PATENTS

| 3,198,849 | 8/1965 | Ballestra | 23—1 X |
| 3,220,998 | 11/1965 | Berger | 260—698 X |
| 3,257,175 | 6/1966 | Brooks et al. | 23—283 X |
| 3,150,934 | 9/1964 | Hazard | 23—285 |

JAMES H. TAYMAN, Jr., *Primary Examiner.*